G. Focht.

Tackle Block,

No. 1,853. Reissued Jan. 17, 1865.

Witnesses:

Jos. L. Coombs

Geo. H. Gregory

Inventor:

George Focht by A. Rick his atty

AM. PHOTO-LITHO. CO. N.Y. (OSBORNE'S PROCESS)

UNITED STATES PATENT OFFICE.

GEORGE FOCHT, OF READING, PENNSYLVANIA.

IMPROVED ATTACHMENT FOR TACKLE-BLOCKS.

Specification forming part of Letters Patent No. 21,602, dated September 28, 1858; Reissue No. 1,853, dated January 17, 1865.

*To all whom it may concern:*

Be it known that I, GEORGE FOCHT, of Reading, county of Berks, in the State of Pennsylvania, have invented certain new and useful improvements in attaching and operating tackle-blocks or pulleys and also in the pulley itself; and I do hereby declare that the following is a full and exact description thereof, reference being had to the accompanying drawings, forming a part of this specification, and to the letters of reference thereon.

The nature of my invention consists in so constructing and combining a tackle-block or pulley with an adjustable shank so that the block or pulley will always be in the most desirable relative position with the rope which passes around the pulley; also in extending the sides of the frame which supports the wheel over and beyond the edge of the wheel and curling or rounding outward this edge so as to present on the inner side, of the frame a smooth rounded surface to protect the rope from wearing away upon the edge of the frame, and likewise keep the rope always in the groove of the wheel.

To enable others skilled in the art to make and use my invention, I will proceed to describe its construction and operation, similar letters representing like parts in each figure.

Figure 1:
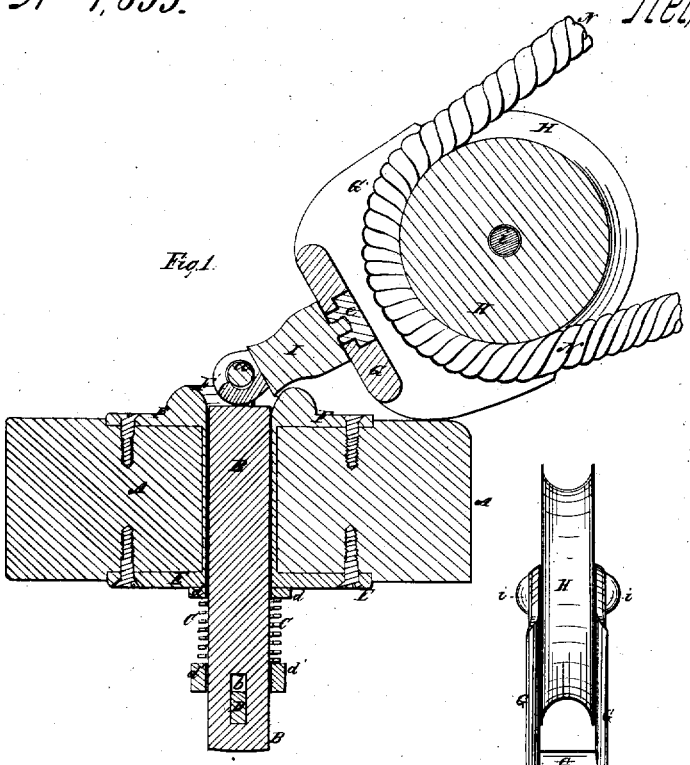
Figure 2:
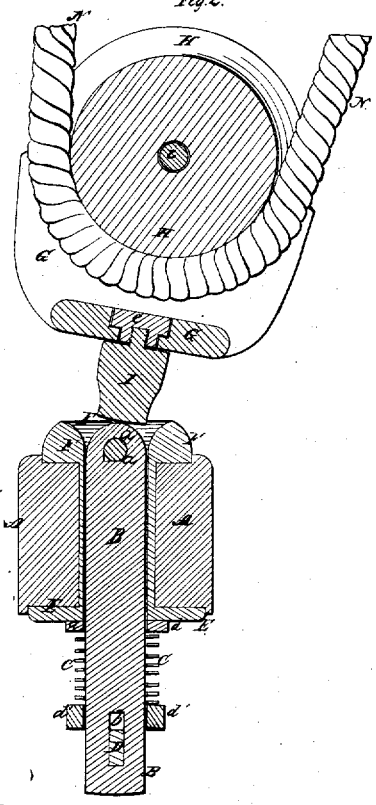
Figure 2:
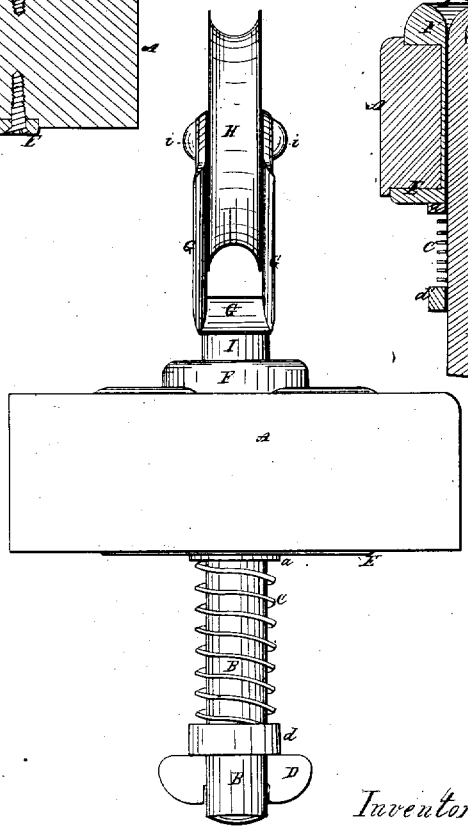

Figure 1 represents a vertical section through the center of my improved block or pulley. Fig. 2 represents a similar section with the parts in a different relative position to that represented at Fig. 1. Fig. 3 is an edge view showing the turned or rounded edge.

A represents a portion of a beam to which the tackle-block is attached. B is a spindle passing through a hole made in the beam to receive it. One end of the spindle is formed with an eye to receive the eye of the stud-piece I of the block. The other end extends through and out of the block about one-third of its length, or any suitable distance to allow the play desired, and is surrounded by a spiral spring, C, and washers *d d'*. The spindle is prevented from drawing through these and the washer *d'* kept in position to act upon the outer end of the spring C by means of a key-hole, *b*, in its end, which receives a key, D, whose ends rest upon the washer *d'*. E is a plate on that side of the beam through which the end of the spindle B that receives the key protrudes. F is a plate and socket on that side of the beam next to the block or pulley. This socket extends through the block A, forming a bearing for the spindle. I is a stud piece having an eye at one end, which is linked into the eye of the spindle. The other end is screwed into a bushing, *e*, in the butt or end of the block G. The socket F', it will be seen, is bell mouthed or flared at its outer end to allow the stud-piece I, as the block changes its position, to turn freely and smoothly in all directions upon the spindle, while the stud-piece I, being secured to the bushing *e*, which is free to turn in the butt of the block or pulley, allows it to turn freely on the stud-piece.

G is the pulley or block made of iron, or any other suitable metal or material, either cast or wrought, and having the sides of its frame extended over and beyond the edge of the wheel H, which is pivoted and turns on the pin *i*, passing from one side of the frame to the other, the edges of the sides of this frame curled or rolled over in the form of a lip or rounded from the inside outward, as shown at Fig. 3. The edge of the butt is also rounded, as shown at Figs. 1 and 3, thus allowing much play for the rope, keeping it from slipping off the wheel, and presenting in all parts a smooth rounded surface, and thus producing but little wear upon the rope.

The parts being constructed and arranged together as described and illustrated in the drawings, a rope, N, is passed around the wheel H in the usual way. As soon as the rope is put under strain, or made taut, the spindle B is pulled through the hole or socket F in the beam A, as seen at Figs. 1 and 2. The spiral spring is now compressed, and it will be seen that in this position the stud-piece I can swing around freely in all directions upon the spindle. The spindle can turn, and likewise the block is free to turn on the stud-piece I; consequently the block or pulley is free to turn in any and all directions to accommodate itself to the variable directions in which the rope may be made to run. When the strain is taken off the rope, the spiral spring being of sufficient strength, pulls the spindle back into its bearings, bringing within the socket I′ the stud piece I, which is then unable to turn in any direction, and is compelled to remain in a vertical position or keep in a line with the spindle and retain the block in the proper relative position with the rope as left when the strain ceased, so that on again applying the strain or tightening the rope the pulley is in exactly the right relative position with the rope without drawing or rubbing the latter over its edge. The rounding or turning over of the edge allows a free passage of the rope and prevents abrasion.

What I claim as new, of my invention, and desire to secure by Letters Patent, is—

1. So attaching a tackle-block or pulley that it may turn freely in all directions and be retained in the proper relative positions with the rope when the strain on the rope ceases, substantially as described.

2. The combination of the stud-piece of the pulley with the spindle having a spiral spring around its other end, substantially as and for the purpose described.

3. The combination of the stud-piece of the pulley with a spindle with plate F, having a bell-mouthed or flaring socket, as and for the purpose described.

4. Extending the sides or edges of the frame of the pulley over and beyond the edge of the wheel and curling or rounding outward the edges of this frame, so as to present a smooth rounded surface for the rope to strike against, thereby lessening the wear upon the rope, substantially as described.

GEORGE FOCHT.

Witnesses:

GEORGE PRINTZ,
JOHN F. GEIST.